United States Patent [19]

Ramaswamy

[11] Patent Number: 5,023,103
[45] Date of Patent: Jun. 11, 1991

[54] FIBER AND METHOD OF MAKING

[75] Inventor: Setlur R. Ramaswamy, Louisville, Ky.

[73] Assignee: D. D. Williamson & Co., Inc., Louisville, Ky.

[21] Appl. No.: 285,356

[22] Filed: Dec. 14, 1988

Related U.S. Application Data

[63] Continuation of Ser. No. 6,901, Jan. 27, 1987, abandoned.

[51] Int. Cl.$^5$ ................................................. A23L 1/10
[52] U.S. Cl. ...................................... 426/626; 127/37; 426/549
[58] Field of Search .................... 426/549, 626; 127/37

[56] References Cited

U.S. PATENT DOCUMENTS

| | | |
|---|---|---|
| 1,570,389 | 1/1926 | Morgenier . |
| 1,588,335 | 6/1926 | Puttaert et al. . |
| 2,709,699 | 5/1955 | Wolf et al. . |
| 2,801,955 | 8/1957 | Rutenberg et al. . |
| 3,787,241 | 1/1974 | Eickemeyer . |
| 3,817,826 | 6/1974 | Hoye . |
| 3,970,712 | 7/1976 | Friese . |
| 4,038,481 | 7/1977 | Antrim et al. . |
| 4,181,747 | 1/1980 | Kickle et al. . |
| 4,239,906 | 7/1977 | Antrim et al. . |
| 4,239,906 | 12/1980 | Antrim et al. . |
| 4,341,805 | 7/1982 | Chaudhary . |
| 4,497,840 | 2/1985 | Gould et al. . |
| 4,551,331 | 11/1985 | Rudin . |
| 4,565,702 | 1/1986 | Morley et al. . |
| 4,599,240 | 7/1986 | Thompson . |
| 4,619,831 | 10/1986 | Sharma . |

FOREIGN PATENT DOCUMENTS

| | | | |
|---|---|---|---|
| 515145 | 11/1979 | Australia . | |
| 0232051 | 12/1984 | Japan ................................... | 426/626 |
| 1570513 | 7/1980 | United Kingdom . | |

OTHER PUBLICATIONS

Solka-Floc Powdered Cellulose by the James River Corporation, pp. 1 and 2.
Canadian Harvest Process Ltd., Rice Fibre, Peanut Fibre, Fibre Supplement, Roasted Wheat Bran and Special Rosted Corn Bran Keycel Powdered Cellulose, pp. 1 and 2, 10/86.
Abstract Bulletin of the Institute of Paper Chemistry 56 (1985) Feb., No. 8, p. 978, Appelton, Wisconsin.
Vetter: Fiber as a Food Ingredient, 156 Food Technology, 38 (1984) Jan., No. 1, p. 64-69, Chicago, Illinois.
Pulp and Paper Manufacture; "The Pulping of Wood"; 2nd Edition; vol. 1; pp. 347-348.
Chemical and Process Technology Encyclopedia; pp. 934-935.
Peterson et al., Encyclopedia of Food Science (1978); pp. 523-526, Avi Westport, Coun.
Juliano, Rice: Chemistry and Technology (1985); pp. 718, 719, 695 and 699, the American Assoc. of Cereal Chemists: St. Paul, Minn.
Webster, Oats: Chemistry and Technology (1986); p. 88, Amer. Assoc. of Cereal Chemists: St. Paul Minn.
The Chemistry of Silica, Ralph K. Iler.

Primary Examiner—Joseph Golian
Attorney, Agent, or Firm—Wood, Herron & Evans

[57] ABSTRACT

An extremely white water absorbent fiber having a high percentage of total dietary fiber and hemicellulose and a low concentration of lignin and silica is disclosed. The dietary fiber is formed by subjecting ground oat hulls to an alkaline digestion at elevated temperatures and pressures. The digested oat hulls are then filtered, neutralized and bleached to form the desired end product. The formed fibers are comparable or better than fibers formed by digestion of wood products. These fibers can be added in high concentrations to bakery products, particularly bread, without imparting a gritty feel to the bread or causing significant discoloration of the bread.

8 Claims, No Drawings

FIBER AND METHOD OF MAKING

This application is a continuation of application Ser. No. 006901, filed Jan. 27, 1987 and now abandoned.

BACKGROUND OF THE INVENTION

Dietary fiber is dietary matter which increases fecal bulk. It is formed from those parts of plant material in the diet which are resistant to digestion by secretions in the human gastrointestinal tract. Chemically, total dietary fiber includes cellulose, hemicellulose, pectins, gums, lignin and mucelagenous material. These are basically the fibers that pass through the intestines but are not acted upon in the gastrointestinal tract.

Adequate fiber in the human diet has been shown to be important for various health reasons including the reduction of the risk of certain types of cancer. Dietary fiber is also important because it permits increasing the bulk of food intake without increasing calorie content.

Plant fiber is added to domestic animal feed. Animals such as cows and pigs and the like have the ability to obtain some nutritional value from this material. Of course, with animals, such as cows and pigs, there is little or no concern with gritty feel, color, and the like. The fibrous material requires little, if any, pretreatment to be acceptable for these purposes.

Seed hulls, stems, wood, bark and the like have been suggested as sources of lignins, hemicellulose and other related products. These chemicals are removed from the plant material by extraction processes which presumably leave fibrous material as a residue or by product. This resulting unextracted fibrous residue is frequently discarded or used in a paper process or fed to animals. Accordingly, the quality of the residual fiber is not a primary concern and there certainly is no reason in these processes to attempt to obtain a product suitable for human consumption.

For example, Wolf et al U.S. Pat. No. 2,709,699 discloses the alkaline extraction of hemicellulose from plant substances. The hemicelluloses are used as thickening agents, protective colloids and ingredients in coating compositions. This patent does not disclose the status of the resulting undigested, unextracted material or even if there is any resulting undigested fibrous material.

Gerrish et al U.S. Pat. No. 3,879,373 discusses extraction of pentosans from wheat bran. If any resulting fibrous product is obtained, it is not disclosed, nor is there any suggestion of the use of any of the resulting fibrous material.

Friese U.S. Pat. No. 3,970,712 discloses a four step process for hydrolizing oat husks to obtain D-(+)-xylose. The solid residue is described as a "foodstuff grade cellulose". But following the steps disclosed in this patent to ensure adequate recovery of xylose provides a cellulose which has a gritty mouth feel and poor water absorbancy. Since the disclosed process attempts to maximize xylose recovery, quality of the resulting residue is a secondary consideration at best. Further, the residue has an off color, gritty mouth feel and poor water absorbancy. The multiple steps required to obtain the residue is also prohibitively expensive.

Antrim U.S. Pat. No. 4,038,481 discloses the treatment of corn hulls to obtain various fractions. Again there is no disclosure that the remaining undigested material is suitable for use as dietary fiber.

Kickle et al U.S. Pat. No. 4,181,747 and Antrim U.S. Pat. No. 4,239,906 disclose obtaining cellulosic products from seed materials.

Dietary fiber for human consumption must have various physical properties to be commercially acceptable. These properties are of little or no concern when the fiber is used for animal consumption or is the by product of an extraction. Of course it must have a high concentration of dietary fiber. Otherwise the product would serve no purpose or would have to be added in such high concentrations as to be impractical. Since hemicellulose is dietary fiber, it is important not to remove this when forming dietary fiber. It is believed that the hemicellulose helps reduce serum cholesterol.

The texture and mouth feel of the dietary fiber is also very important. If dietary fiber has a gritty feel, it will tend to alter the texture or mouth feel of any product to which it is added. This limits the percentage of dietary fiber which can be added to a product.

Water absorbancy is also important and is related to texture. A fiber which has a high rate of water absorbancy can be easily mixed and dispersed in a dough product. This permits addition of higher concentrations of dietary fiber. Also, this permits formation of a product which has a better mouth feel. Water absorbancy also improves the shelf life of the finished product. Physiologically water absorption is important to provide a stool softening effect reducing transit time and increasing bulk.

Thompson, U.S. Pat. No. 4,599,240 discloses a process of obtaining fibrous material from hulls of legumes such as soybean hulls. This process uses a complex bleaching process using chlorine gas with subsequent basic digestion. The reference indicates that this process is not applicable on a practical basis to wood, stalk portions of plants, or the husk portions of various cereal grains.

Because of its ability to produce a relatively white, non-gritty fiber, wood is currently the primary source of dietary fiber supplements. Because food components must frequently be identified in product labels and wood products are not perceived as an appealing food product, it is preferable to use a source of dietary fiber other than wood. Further, dietary fiber obtained from wood is so unpalatible that it can be substituted for no more than about 15% of the flour in bread.

In finding an alternate source of dietary fiber there are two major problems—selecting suitable plant material, and selecting a suitable extraction method. Many different types of plant material have been suggested as sources of dietary fiber varying from wood, which is most commonly used to various seed plant materials including pea hulls, corn hulls, peanut hulls, oat hulls and stems and the like. Generally the softer plant materials such as pea hulls and corn hulls are considered better sources because they are easily processed. However, these materials fail to provide a dietary fiber comparable in color, texture and water absorbancy to wood derived dietary fiber.

Oat hulls would seem to be a particularly good source material for dietary fiber. Their cost is low and currently are primarily used in furfural production, as fillers in foundry molds and as abrasive cleaners. There are sufficient oat hulls produced to supply most of the current demand for dietary fiber. Further, there is a year round supply of oat hulls.

In spite of this, oat hulls have not provided a source of dietary fiber comparable to wood fiber. Prior Methods of obtaining dietary fiber from oat hulls are unsuitable for obtaining a white dietary fiber that is even comparable to currently marketed wood fibers. Oat hulls contain a high concentration of lignin which is difficult to remove. Lignin content decreases water absorption and provides an off color. Oat hulls contain silica spicules. These spicules are pointed formations of silica which are part of the oat hull. The silica reduces water absorption and significantly increases the gritty feel of the obtained fibers. For these reasons, in spite of the availability and cost, one of the most apparently unsuitable materials for obtaining a dietary fiber is the oat hull.

SUMMARY OF THE INVENTION

The present invention is premised on the discovery that a dietary fiber vastly superior to the wood dietary fibers in terms of a combination of whiteness, texture and water absorbancy can be obtained from ground oat hulls despite the aforementioned difficulties. More particularly, by digesting the oat hulls at a pH, temperature and pressure effective to remove most of the silica and lignin in the oat hulls provides a material which has a high dietary fiber content. The severity of the alkaline digestion provides a dietary fiber having a high water absorbancy and a non-gritty mouth feel.

Surprisingly, these produced fibers are as good as or better than dietary fiber obtained from wood. The fibers of the present invention have a high dietary fiber content, generally in excess of about 90%. The mouth feel of these fibers is not gritty as with other fibers obtained from seed hulls.

These fibers posess superior water absorbancy in excess of 6 and even 7 grams of water per gram of fiber. For health reasons, this is important because it has a stool softening effect, reduces transient time and increases bulk. Water absorbancy is also important because it improves the quality of products which incorporate these fibers. For example, a more water absorbant fiber can be more easily mixed in dough products. Better mixing is important for texture, body, mouth feel, volume (density) and taste of these products. This also improves shelf life of the end product.

Bleaching the fibers of the present invention with, for example, a hypochlorite bleach, bisulfite bleach, ozone or hydrogen peroxide improves the product even more providing a whiter fiber. These and other advantages of the present invention will be further understood in light of the following detailed description.

DETAILED DESCRIPTION

According to the present invention, a dietary fiber is obtained from oat hulls by an alkaline digestion of ground oat hulls. The hulls themselves are an unwanted waste product which can be obtained from various oat grinding processes, wherein the various internal contents of the oat seed are removed. The particular type of oat hull is insignificant with respect to the present invention. Oats are of the genus Avena. Most oats are white and red oats and primarily A. SATIVA and A. BYZANTINA. However, other oat species are acceptable for use in the present invention.

The oat hulls themselves have the following general composition (Dry Weight):

| | |
|---|---|
| lignin | 17-20% |
| silica (measured as ash) | 4-7% |
| hemicellulose | 28-30% |
| crude fiber | 30-40% |

This may vary from species to species.

Dry oat hulls as obtained as a waste product are initially ground to a mesh of 30 or smaller. The grinding step is merely to provide greater surface area for the digestion step. Accordingly, it can be eliminated.

The ground oat hulls are then subjected to an aqueous, alkaline digestion. The alkaline digestion is conducted in an autoclave containing a digestion liquor and at elevated temperatures and at saturation pressures.

The digestion liquor is an aqueous alkaline solution. Suitable alkalis for the digestion liquor include any alkali metal hydroxide, such as potassium hydroxide and sodium hydroxide which is preferred due to cost. Primarily, hydroxides must be employed in order to obtain the desired pH and make the lignins and silicates soluble.

The pH of the digestion liquor should be at least about 11, and preferably even higher, depending of course on intended reaction temperature, pressure and time, which will all affect the digestion. Preferably, the pH will be in the range of 11 to 14, with a preferred range at about 12 to 13. With sodium hydroxide, this will require a concentration based on combined water and oat hulls of about 4.5% to 5.0%. Substantially higher concentrations can be employed with the limiting factor being the deterioration of the yield of total dietary fiber through increased solubilization of hemicelluloses. Preferably to maintain a yield of more than 25% of the oat hulls, the concentration of sodium hydroxide should be less than about 10% when the digestion temperature is about 150° C.

The temperature of the digestion will vary depending on the desired reaction time. The temperature can be varied anywhere from about 100° C. to up to 200° C. This will provide saturation pressures of from 0 psig to over 250 psig, with the preferred range being from about 15 psig to 150 psig.

The time of the reaction will be varied in combination with the pH, temperature and saturation pressure to provide for an effective digestion. The digestion will dissolve portions of the oat hulls leaving an undissolved fibrous product which can be separated from the digestion liquor and analyzed.

Analysis of the fibrous product, i.e., the digested oat hull fibers, provides a simple determination of whether the digestion has been effective. It is important that the digested oat hull fibers on a dry basis contain less than about 1% lignin and less than about 2% silica, measured as ash content. Once these two components have been removed to the defined degree, the digested product is suitable for the present invention and the defined degree of digestion has been effected. Observation of the digested oat fiber also provides an indication of an effective digestion. If the oat hull fibers, after bleaching, have a non-gritty mouth feel and high water absorbancy (at least about 6 and preferably higher than 6 grams of water per gram of fiber which is a water absorbency of at least about 600%), the digestion has been effective.

In the preferred range, the digestion will be conducted at about 150° C. to 175° C., providing saturation pressure of above 65 psig for about 2 hours.

Preferably the digested oat hulls are further processed to provide a product which is commercially more acceptable in certain markets.

The digested oat hulls are cooled to about 65° C. and separated from the digestion liquor by vacuum filtration. A mat of digested oat hull fibers is obtained and hot water is then pumped through the mat fibers, which are again filtered. These fibers are then washed one or more times with water and filtered and bleached to provide an even whiter fiber.

The composition of the digested fibers before bleaching is:

| | |
|---|---|
| lignin | .4–.7% |
| silica | 1.3–1.5% |
| dietary fiber | 92–95% |
| hemicellulose | 11–13% |

The color of the digested fibers is a light tan. This is caused by residual lignin.

The bleaching step is optional, but significantly improves the whiteness of the product and accordingly provides for a more commercially acceptable product. The fibers are bleached by subjecting the digested fibers to an environment effective to whiten the fibers. Suitable bleaching environments include an aqueous solution of hypochlorites such as $NaClO_2$, an aqueous solution of sulfite such as $Na_2SO_3$, an aqueous solution of a peroxide such as $H_2O_2$ or ozone gas. Preferably the filtered fibers are slurried in the bleaching solution. The concentration must be effective to whiten the fibers such as a sodium hypochlorite solution of 0.1% concentration.

When an aqueous hypochlorite solution (0.1%) is used as a bleaching solution, the fibers are subjected to the solution at 25° C. for about 8 hours. Generally 1200 gallons of this bleaching solution is employed for 1000 pounds of fiber.

The bleached fibers are neutralized with an acid such as hydrochloric acid and repeatedly washed and filtered with water and dried. The drying is conducted in a fluid-bed drier or any suitable drying apparatus at 150° C.

The washed/dried fibrous material is then ground to a desired mesh. A suitable desired mesh may vary from 100% passing through a 50 mesh screen to 98% passing through a (200) mesh screen.

The present invention will be further appreciated in light of the following examples.

EXAMPLE 1

Formation of Fiber

The following reaction was conducted in a pressure reactor which had a volume of 750 gallons. To the reactor was added 500 gallons of water and 45 gallons of a 50% sodium hydroxide solution. After the sodium hydroxide was completely dispersed, 1000 pounds of raw oat hulls ground to a 30 mesh size were added to the sodium hydroxide solution. The analysis of the undigested oat hulls was as follows:

| | |
|---|---|
| Moisture | 10% |
| Protein | 3% |
| Ash | 5.5% |
| Carbohydrates | 80.4% |

The reactor was sealed and the solution heated to 150° C. to 160° C. for 2 hours. This generated a saturation pressure of about 65 psig. After this 2 hour digestion, the digestion liquor was cooled to 65° C. and the digested oat hull fibers were collected by vacuum filtration. This provided a mat of fibers which was then cleaned by passing hot water over the mat. This was then filtered, washed with water, filtered again and slurried in 1,000 gallons of a 0.1% solution of sodium hypochlorite bleach at 25° C. After a period of 8 hours, the fibers were again separated by filtration, neutralized to a pH of 6.5 to 7.5 with hydrochloric acid (35% concentration). The fibers were then collected by filtration, washed with cold water, dried in a fluid-bed drier at 150° C. for a period of 15 minutes. The dried fibers were then ground to 50 mesh or finer.

The end product is 91.4% dietary fiber, with a crude fiber content of 69.2%. The amount of pentosans is 12.5%, ash content 1.46%, lignins 0.6%.

EXAMPLE 2

Water Absorption of White Oat Fiber 5 grams of white oat fiber obtained in Example 1 is soaked in 50 grams of distilled water filtered through a 5" diameter #4 Whatman filter paper using slight suction to pull off free water. The filtrate collected was accurately weighed. The difference in weight between 50 grams and the filtrate is the water absorbed by 5 grams of the white oat fiber. The water absorption was calculated as 6.9 grams water per gram of fiber.

Thus, by practicing the present invention using an alkaline digestion effective to remove substantially all the lignin and all of the silica or spicules in the oat fiber, one can obtain a fiber which has a very high dietary fiber content which is white in color, highly water absorbant, low in silica content, low in lignin content, and high in hemicellulose content.

The process of the present invention can also be practiced continuously. In this embodiment, the alkaline digestion is conducted in a heated pressurized screw or auger type continuous reactor. The rate of movement through the reactor is adjusted relative to pH, temperature, pressure and reactor length to provide an effective digestion.

The fiber residue is deposited onto a continuous belt filter where the digestion liquor is removed from the oat fiber residue. While on the belt, the fiber residue is repeatedly washed and dried. The washed and dried fibers are deposited by the belt into a bleaching apparatus which can be continuous or preferably is simply a vat. The bleaching, neutralization, drying and grinding steps remain the same as with the batch operation.

The dietary fibers of the present invention can be used in a variety of different ways. Primarily these would be used in baking products particularly baked dough products such as bread. Because of its soft texture and high water absorbancy, these can be added to dough products in amounts from 1% to 50% or more and preferably about 15% to about 50% based on flour weight without imparting a gritty feel or off-taste to the finished product. This can be further appreciated in light of the following detailed example.

EXAMPLE 3

Bread

A sponge was made by combining flour, water, yeast and mineral yeast food in the following proportions:

|  | Baker's % | Weight |
|---|---|---|
| Flour | 70 | 250 |
| Water | 57 | 205 |
| Yeast | 2.8 | 10 |
| Mineral Yeast Food | .3 | 1 |

The sponge was mixed and allowed to ferment for 4 hours. Initial sponge temperature was 68° F. and final sponge temperature was 73° F.

The dough had the following ingredients:

|  | Baker's % | Weight |
|---|---|---|
| Flour | 30 | 107 |
| Water | 87 | 310 |
| Yeast | 2 | 7 |
| Salt | 2.5 | 9 |
| Sugar | 7 | 25 |
| Milk Solids | 2.5 | 9 |
| Shortening | 3.6 | 13 |
| Emulsifier | .6 | 2 |
| Oat Fiber | 35 | 125 |
| Vital Wheat Gluten | 14.8 | 53 |

All of the dough ingredients except the oat fiber were mixed until all ingredients were mixed. Then the oat fiber and sponge were added. This was mixed at a low speed for 1 minute and for 9 minutes at medium speed. After mixing, the dough temperature was 80° F. No floor time was allowed. The dough was scaled to 550 grams and an intermediate proof time of minutes was given. After the intermediate proof time, the dough was molded, proofed at 97° F. for 39 minutes. Next it was placed in a revolving bread oven at 430° F. for 29 minutes. The loaf was allowed to cool and was bagged. The baked weight was 484 grams.

The formed bread had an excellent appearance in terms of break, shread, volume and texture. There was no off taste and no gritty mouth feel.

EXAMPLE 4

Bread

A sponge was made from the following ingredients:

|  | Baker's % | Weight |
|---|---|---|
| Flour | 100 | 214 |
| Water | 82 | 176 |
| Yeast | 3.7 | 8 |
| Mineral Yeast Food | .4 | 1 |

The sponge was mixed and allowed to ferment for 3.5 hours. Initial sponge temperature was 70° F. and final sponge temperature 75° F.

The dough included the following ingredients:

|  | Baker's % | Weight |
|---|---|---|
| Water | 153 | 327 |
| Yeast | 2.8 | 6 |
| Salt | 2.6 | 5.5 |
| Sugar | 7 | 15 |
| Milk Solids | 2.6 | 5.5 |
| Shortening | 3.7 | 8 |
| Emulsifier | .9 | 2 |
| Oat Fiber | 49 | 105 |
| Vital Wheat Gluten | 17.8 | 38 |

All dough ingredients except the oat fibers were mixed for 2 minutes and then the oat fiber was added. After addition of the oat fiber, the sponge was added and mixed at low speed for 1 minute and at medium speed for 12 minutes. After mixing, the dough temperature was 78° F. No floor time was allowed. The dough was scaled to 550 grams and an intermediate proof of 23 minutes was given. After the intermediate proof time, the dough was molded, panned and proofed at 97° F. for 27 minutes. Next it was placed in a revolving shelf bread oven at 430° F. for 37 minutes. The loaf was allowed to cool and was bagged. Baked weight was 480 grams.

Although the formed bread did not have a good appearance, it did not have an off taste nor a gritty mouth feel. Accordingly, the oat fibers of the present invention can be used at about 50 baker's percent.

The fibers obtained according to the method of the present invention are non-wood, white, high dietary fiber product and have a very fluffy quality, high water absorption capacity and a desirable mouth feel. In other words, these can be used in baking products at extremely high concentrations without providing a gritty feel, off taste or texture. Because it is based on oat hulls there is no availability problem, as there would be using dietary fibers obtained from other sources such as yellow pea fibers. The high water absorption characteristics of this product also permits its use in non-baking products, such as low calorie drinks, milk base drinks, soups, yogurt, tofu, pastas, meat fillers, pharmaceuticals, breakfast cereals, sauces, and the like.

The above disclosure was intended to fully disclose the present invention and in particular disclose the best mode of practicing the invention known to the inventors at this time. However, the inventors do not intend to be limited by the above disclosure, except as defined in the following claims, wherein:

I claim:

1. A method of making dietary fiber having a non-gritty mouth feel and water absorbency comprising:
   digesting oat hulls in an aqueous, alkaline solution to provide digested at a combined time, pressure, temperature and pH effective to reduce silica content of said fibers to less than about 2% by weight and reduce lignin content of said fibers to less than about 1% by weight and a water absorption of at least about 600% wherein said pressure is greater than about 15 psig and said pH is greater than about 11.

2. The method claimed in claim 1 wherein said oat hulls are subjected to an aqueous solution of alkali metal hydroxide having a pH of from about 11 to about 13 wherein said time is from about 15 minutes to about 5 hours, said temperature is from about 100° C. to about 200° C. and said pressure is saturation pressure.

3. The method of obtaining dietary fibers as claimed in claim 1, further comprising first grinding said oat hulls.

4. The method claimed in claim 1, further comprising subjecting said collected fibers to an environment effective to bleach lignin in said fibers to provide a whiter product, said environment selected from the group consisting of an aqueous solution of hypochlorite, an aqueous solution of sulfite, an aqueous solution of hydrogen peroxide, and an ozone atmosphere.

5. The dietary fiber made according to the method claimed in claim 1.

6. The dietary fibers made according to the method claimed in claim 2.

7. A method of obtaining dietary fibers comprising:
digesting ground oat hulls in an aqueous alkali metal hydroxide bath to obtain digested oat hull fibers
said bath having a pH of from about 11 to about 13 for a period of time from about 15 minutes to about 5 hours and at a temperature from about 100° C. to 200° C. at saturation pressure to effectively reduce the silica content of the digested oat hull fibers to less than about 2% and to reduce the lignin content of said digested oat hull fibers to less than about 1% and water absorption of at least about 600%;
separating said digested oat hull fibers from said aqueous bath; and
bleaching said digested oat hull fibers by subjecting said fibers to a bleaching environment selected from the group consisting of an aqueous solution of hypochlorite, an aqueous solution of sulfite, an aqueous solution of hydrogen peroxide and an ozone atmosphere.

8. A method of making dietary fiber having a non-gritty mouth feel and high water absorbency consisting of digesting oat hull material in an aqueous alkaline solution to provide digested oat hull fibers wherein said oat hull material is digested in an aqueous solution of alkali metal hydroxide wherein the concentration of alkali metal hydroxide is from about 4.5% to about 10% by weight based on the total concentration of water and oat hulls;
said digestion conducted at a temperature greater than 100° C. at saturation pressure for a time of at least about 15 minutes and until the silica content of said oat hull material is reduced to less than about 2% by weight and the lignin content of said oat hull material is reduced to less than about 1% by weight thereby providing a light colored dietary fiber having high water absorption.

* * * * *